G. D. Bayley,
Spice Box and Cake Cutter,
N° 37,716.    Patented Feb. 17, 1863.

Witnesses.    Inventor.

UNITED STATES PATENT OFFICE.

GEORGE D. BAYLEY, OF LEBANON, NEW HAMPSHIRE, ASSIGNOR TO GILES B. JOHNSON, OF BOSTON, MASSACHUSETTS.

IMPROVED DREDIGNG-BOX, WITH GRATER AND CAKE-CUTTER ATTACHED.

Specification forming part of Letters Patent No. 37,716, dated February 17, 1863.

*To all whom it may concern:*

Be it known that I, GEORGE D. BAYLEY, of Lebanon, in the county of Grafton and State of New Hampshire, have invented an Improved Article for Kitchen Use, which I term a "Combined Grater, Dredge-box and Cake-Cutter," of which the following is a full, clear, and exact description, reference being had to the accompanying drawings, making part of this specification, in which—

Figure 1:
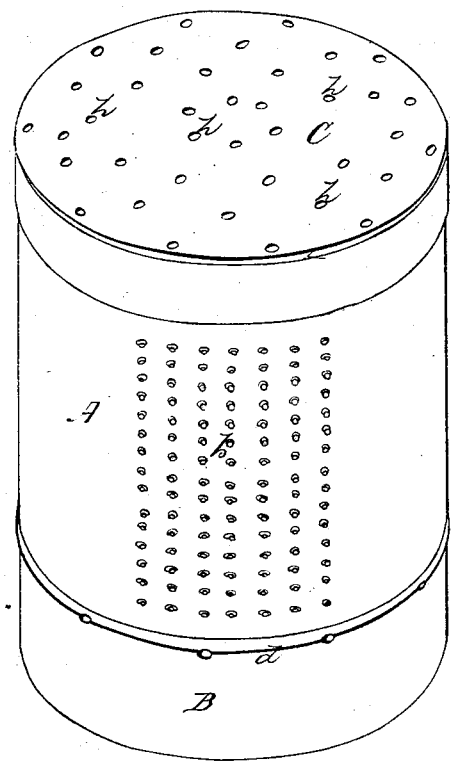
Figure 2:
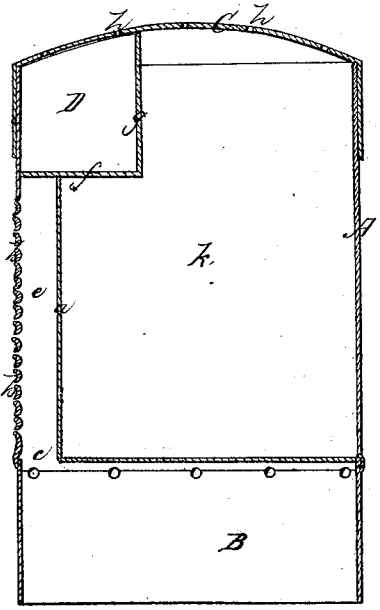

Fig. 1 is a view of the article; Fig. 2, a vertical section through the same.

My present invention consists of a new article for kitchen use, in which are combined a grater, a dredge-box, and a cake-cutter. These three articles, which are in frequent requisition by cooks and particularly by cake-bakers, are now usually made separate, the three articles occupying much more room on the table where the cook works, and being more liable, one or other of them, to be out of reach than they will be when combined in one article.

That others skilled in the art may understand and use my invention, I will proceed to describe the manner in which I have carried it out.

In the said drawings, A is a cylinder, of tin or other suitable metal, which is attached to the top of another cylinder, B, of less height, the top of the cylinder B forming a bottom to the cylinder A. A lid, C, closes the top of the cylinder A. A partition, a, extends vertically nearly the whole height of the cylinder A on the inside near one side, as shown in Fig. 2. It is attached to the cylinder at both edges and the bottom of it is attached to the top d of the cylinder B. The cylinder A is perforated at b like an ordinary grater on the side in front of the partition a. There is an opening, c, to correspond with the space e between the partition a and the side b of the cylinder A. This opening is to permit the nutmeg or other article grated on the roughened surface b to fall out from the space e. A receptacle, D, for nutmegs or other spices, is formed by a plate, f, set on top of the partition a, and attached at its edge to the inner surface of the cylinder A, and by a short vertical partition, g, rising from the inner edge of the plate f. The lid C, when in place on the top of the cylinder A, fits tightly on the top edge of the partition g, and prevents any communication between the receptacle D and the rest of the cylinder A. The lid C is perforated with small holes h over all its top surface. The space k in the cylinder A is to be filled with flour, and to be used as a dredge-box, the flour being thrown out through the holes h. The roughened surface b of the cylinder A is used like an ordinary grater, the spice when grated fine falling out through the hole c. The lower cylinder, B, is to be used as a cake-cutter, to facilitate which operation a few air-holes may be made through the top d of it outside of the cylinder A.

The three articles thus combined in one will be found to be very useful and convenient, and can be produced at a small cost.

What I claim as my invention, and desire to secure by Letters Patent as a new article of manufacture, is—

The above-described article, comprising a grater, dredge-box, and cake-cutter, combined, substantially as set forth.

GEORGE D. BAYLEY.

Witnesses:
SAM. COOPER,
P. E. TESCHEMACHER.